Sept. 9, 1930.   R. MILLER   1,775,436
SPOTLIGHT ADJUSTING MECHANISM
Filed Aug. 19, 1927   3 Sheets-Sheet 1
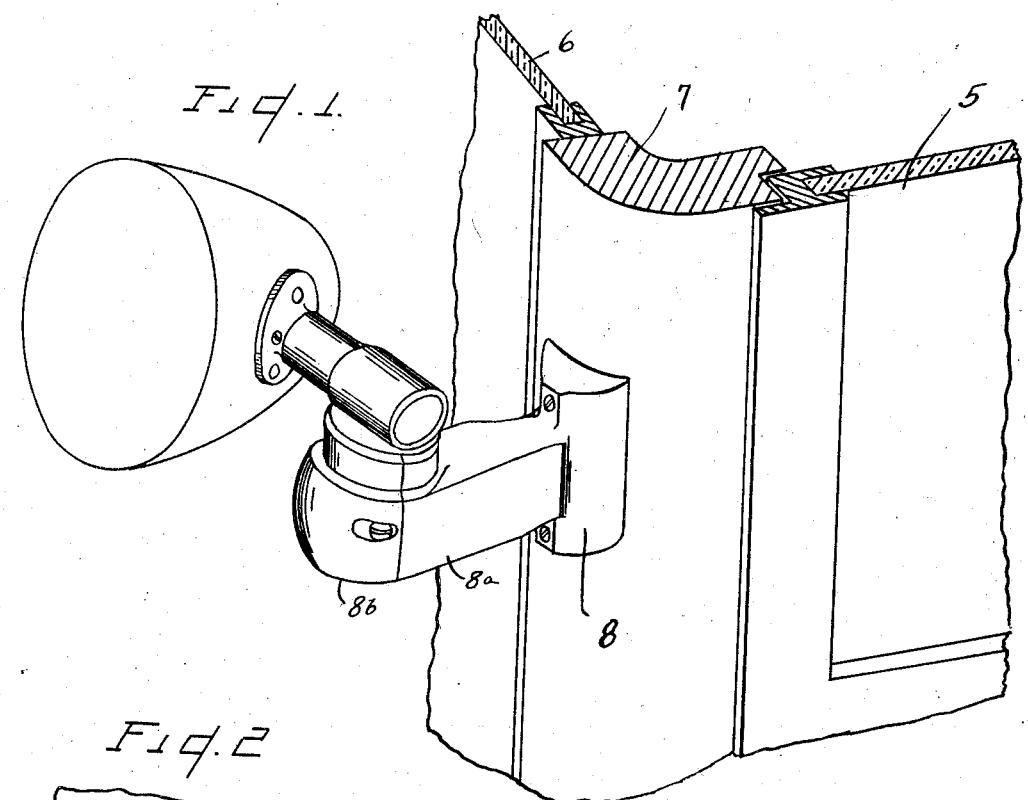
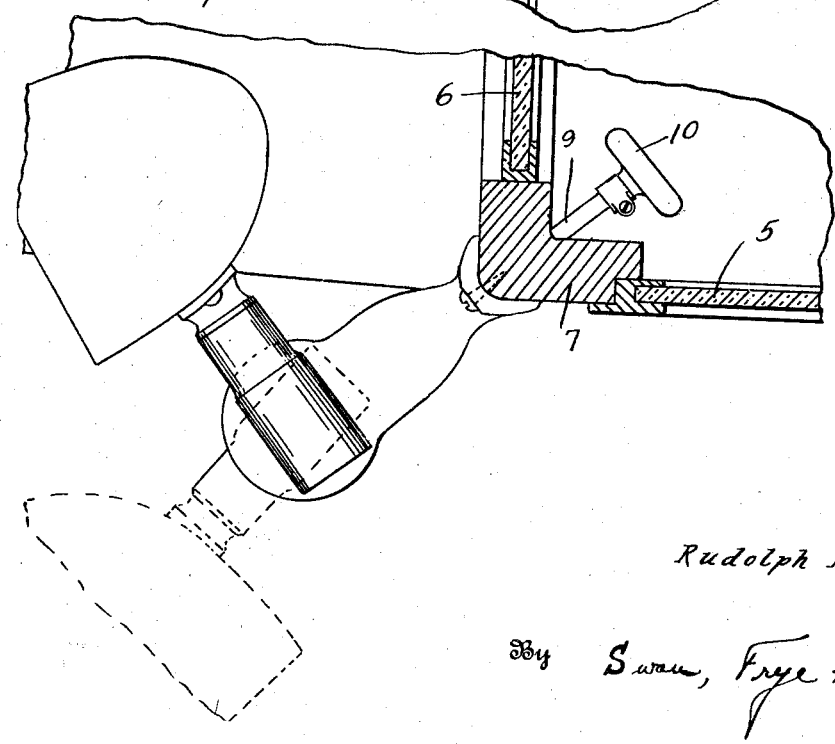
Inventor
Rudolph Miller
By Swan, Frye & Murray
Attorney

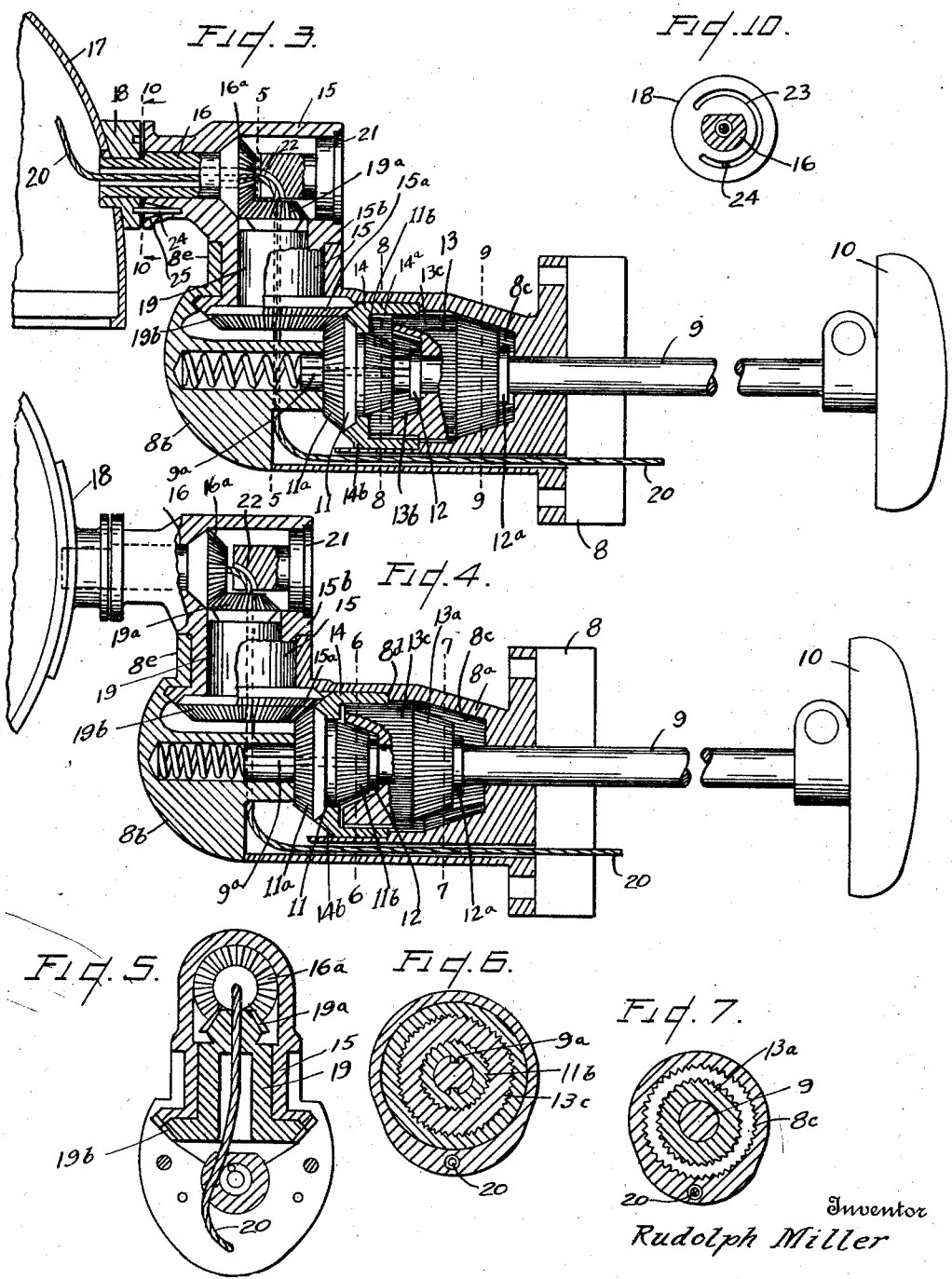

Sept. 9, 1930.  R. MILLER  1,775,436
SPOTLIGHT ADJUSTING MECHANISM
Filed Aug. 19, 1927   3 Sheets-Sheet 3

Inventor
Rudolph Miller
By Swan, Frye & Murray
Attorney

Patented Sept. 9, 1930

1,775,436

UNITED STATES PATENT OFFICE

RUDOLPH MILLER, OF DETROIT, MICHIGAN

SPOTLIGHT-ADJUSTING MECHANISM

Application filed August 19, 1927. Serial No. 214,014.

This invention relates to a lamp support capable of general use, but particularly adapted for use on automobiles, motor boats, and like vehicles.

The principal object of my invention is to provide a simple and comparatively inexpensive construction whereby the lamp can be swung through angles about different axes and whereby the lamp will remain in any adjusted position as long as desired.

The invention further provides mechanism capable of manipulation by a handle within convenient reach of the operator of the vehicle, and whereby rotary movements of the handle can control movements of the lamp through desired angles.

A further object of my invention is the arrangement of a spotlight adjusting mechanism so that it can be controlled from within a closed automobile, or the like, through simple and positively acting adjusting means.

Still another object of my invention is the arrangement of a spotlight adjusting mechanism whereby desired adjustments may be continuously made on through vertical and horizontal axes. In practically all of the spotlight adjusting mechanisms now on the market there is provision for an adjustment on a vertical axis, but after adjustments have also been made to change the position of the spotlight on a horizontal axis the original vertical axis has also been changed to render it oblique. In my construction the vertical axis remains vertical at all times, and the horizontal axis remains permanently horizontal.

Other objects and advantages will be apparent from the following description, wherein reference is made to the accompanying drawings illustrating a preferred embodiment of my invention and wherein similar reference numerals designate similar parts throughout the several views.

In the drawings:

Figure 1 is a perspective view of my improved spotlight adjusting mechanism in position upon a corner post of a closed body of an automobile, a fragmentary portion only of the body being shown.

Figure 2 is a plan view thereof.

Figure 3 is a central vertical section through the adjusting mechanism, and showing the positions assumed when the rotation of the handle is intended to rotate the lamp about a horizontal axis.

Figure 4 is a similar view showing the adjusting mechanism in the positions assumed when the rotation of the handle is intended to rotate the lamp about a veretical axis.

Figure 5 is a detail cross-sectional view, taken substantially on the line 5—5 of Figure 3.

Figures 6 and 7 are detail cross-sectional views taken substantially on the lines 6—6 and 7—7 of Figure 4.

Figure 8:
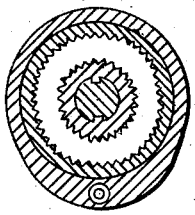
Figure 9:
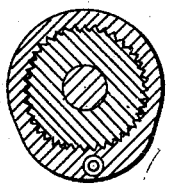

Figures 8, 9 and 10 are detail cross-sectional views taken substantially on the lines 8—8, 9—9 and 10—10 respectively of Figure 3.

Figure 11:
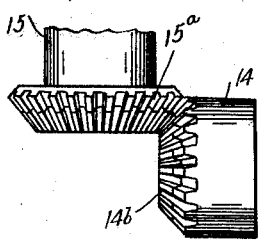

Figure 11 is a fragmentary side elevation showing the manner of arranging the bevel gears in the lower portion of the supporting bracket.

Figure 12:
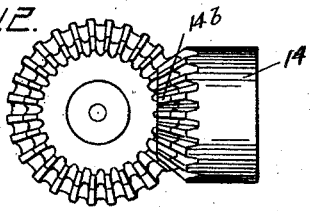
Figure 13:
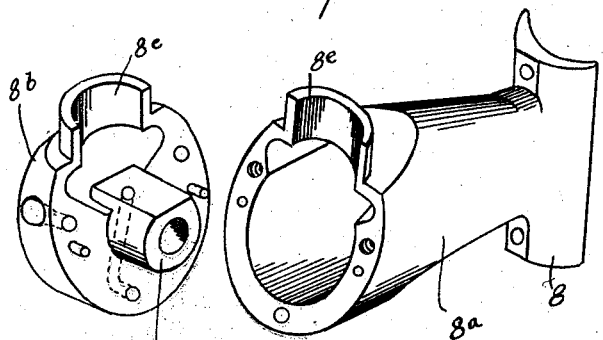

Figure 12 is a view of the parts shown in and taken at substantially right angles to Figure 11, and Figure 13 is a detail perspective view of the hollow bracket forming a casing for the bevel gears shown in Figures 11 and 12.

Referring now to the drawings, the numeral 5 designates an automobile body having a windshield 6 and corner post 7 at one extremity of the windshield. Secured upon the corner post 7 is a bracket 8 forming a hollow frame for the lower portion of my improved spotlight adjusting mechanism and preferably formed in two parts, 8$^a$ and 8$^b$ (note Figure 13) each of which may readily be formed by die-casting with a minimum of machine operation. A handle shaft 9 extends through an aperture in the corner post 7 and through the hollow portion 8$^a$ of the bracket 8, carrying at its rear extremity a handle 10 and adjacent its forward extremity a gear wheel 11, which, as best shown in Figures 3 and 4, comprises a bevel gear 11$^a$ at its forward face and a beveled clutch face 11$^b$ at its rear face. The gear wheel 11 is secured for rotation upon the handle shaft 9 by a key carried by the gear and fitting into an elongated key-way 9ª formed in the handle shaft, whereby longitudinal movement of the handle shaft relatively to the gear 11 is permitted. The handle shaft 9 also carries a pair of collars 12 and 12ª, and between them is loosely mounted a multiple faced clutch member 13 (note Figures 3 and 4). The clutch member 13 is not keyed to the shaft 9 but is moved within the hollow bracket member 8 whenever the shaft 9 is longitudinally moved, as hereinafter pointed out. There are three working clutch faces on the clutch member 13, the rearmost one of which, 13ª, being adapted to interfit with a serrated clutch face cut in the reduced neck portion 8ᶜ of the hollow bracket 8 when the handle shaft 9 is in its normal or retracted position; the foremost clutch face 13ᵇ being arranged to interfit with the clutch face 11ᵇ of the gear wheel 11 when the clutch member 13 is moved to its extreme forward position by longitudinally sliding the handle shaft 9, and the intermediate clutch face 13ᶜ being arranged to slidably fit within an internal serrated clutch face 14ª carried by the gear wheel 14 encircling the gear wheel 11. The teeth of the intermediate clutch face 13ᶜ are always in mesh with the teeth of the internal clutch face 14ª regardless of the sliding movements of the clutch member 13 because of the longitudinal movements of the shaft 9. The gear wheel 14 is arranged to have an inner bearing on the smooth portion of the gear wheel 11 intermediate the bevel gear 11ª and clutch face 11ᵇ, and an outer bearing upon the hollow bracket 8, a shoulder 8ᵈ serving to prevent rearward movement of the gear wheel 14 along with the clutch member 13, with one of the clutch faces of which it interfits. At its forward extremity the gear wheel 14 is provided with a bevel gear 14ᵇ the teeth of which may be cut only a part way around its circumference (note Figures 3, 11 and 12).

Cooperating with the partial bevel gear 14ᵇ is a gear wheel 15ª formed at the lower extremity of a hollow bracket 15 arranged to rotate within the upwardly extending split collar sections 8ᵉ carried by the separable portions 8ª and 8ᵇ of the hollow bracket 8, a shoulder 15ᵇ being adapted to rest upon the upper faces of the collar portions to afford a bearing for the rotation of the bracket 15. The teeth on the gear face 15ª may also extend only partially around its circumference. Above the collar 15ᵇ the bracket 15 extends at right angles to its lower portion and is hollowed to form a bearing for the stub shaft 16 carrying the lamp casing 17. The stub shaft 16 is best shown in Figures 3 and 4, and consists of a hollow shaft carrying at its rear extremity a bevel gear 16ª and adjacent its forward extremity is flattened to receive the casing bracket 18 and pass through a similarly shaped aperture in the casing 17.

The extreme forward tip of the hollow shaft 16 is preferably flared outwardly to exert a riveting action upon the lamp casing 17 and casing bracket 18 to insure maintenance of the lamp casing upon the shaft despite vibrations of the vehicle upon which my improved lamp adjusting mechanism is mounted. The bevel gear 16ª of the stub shaft 16 meshes with the bevel gear 19ª formed at the upper extremity of a hollow gear wheel 19 arranged within the lower vertical portion of the bracket 15 and terminating at its lower extremity in a bevel gear 19ᵇ meshing with the forward bevel gear 11ª of the gear wheel 11 keyed upon the handle shaft 9.

The wire 20 for connecting the usual bulb (not shown) arranged within the lamp casing 17 with the battery, or other source of power, carried by the automobile or like vehicle, extends through the central aperture in the hollow shaft 16 and the central aperture in the hollow gear wheel 19, thence passes through the hollow bracket 8 and an aperture in the corner post 7 into the body 5 of the automobile, where suitable connection is made with a lead wire from the battery. A plug 21 is arranged to close the horizontal aperture in the upper part of the bracket 15 and carries an inwardly extending member having an arcuate notch 22 therein for bracing the wire 20 where it turns from horizontal to vertical positions (note Figures 3 and 4).

In operation, the lamp casing 17 can be rotated about a horizontal axis by merely turning the handle 10 when in its normal or retracted position shown in Figure 3. A coiled spring 21 is arranged in a central hollow guide 22 carried by the end member 8ᵇ of the hollow bracket and presses upon the forward face of the handle shaft 9, which is guided for longitudinal movement by the aperture in the guide 22. When the handle and shaft 9 are in their normal retracted positions, the clutch member 13 has its rearmost clutch face 13ª in mesh with the fixed clutch face upon the reduced neck portion 8ᶜ of the bracket 8 and so is held from rotation and since it is also in mesh with the internal clutch face 14ª of the gear wheel 14 through its intermediate clutch face 13ᶜ it will hold the gear wheel 14 against rotation. The gear wheel 11, however, being keyed upon the handle shaft 9 will be rotated whenever the handle shaft is rotated. The rotation of the gear wheel 11 causes the rotation of the gear wheel 19 because of the intermeshing of the forward bevel gear 11ª with the lower bevel gear 19ᵇ. The rotation of the gear wheel 19 will transmit rotary movement through its upper bevel gear 19ª to the hollow stub shaft 16 carrying the lamp casing 17. Accordingly the lamp casing is swung around a horizontal axis through the hollow shaft 16 according to the degree of rotation of the handle 10.

When, however, the handle shaft 9 is longitudinally slid forwardly to substantially the position shown in Figure 4 the clutch member 13 is also moved forwardly to disconnect its rearmost clutch face 13ᵃ from the fixed clutch face in the reduced neck portion 8ᵉ of the bracket 8, and its foremost clutch face 13ᵇ is brought into mesh with the clutch face 11ᵇ of the gear wheel 11. Accordingly, rotation of the handle 9 will now turn the gear wheel 11 and through it the clutch member 13, the intermediate clutch face 13ᶜ of which is still in mesh with the internal clutch face 14ᵃ of the gear wheel 14, the forward bevel gear 14ᵇ of which meshes with the bevel gear 15ᵃ formed at the lower extremity of the rotatable bracket 15. The rotation of the gear wheel 14 will now cause the rotation of the bracket 15 and the lamp casing on a vertical axis. Should it not be desired to turn the lamp through a complete circle on its vertical axis, the number of teeth on the interfitting gears 14ᵇ and 15ᵃ can be limited to cover only a portion of the circumference of the gear facing, but it is to be understood that I also contemplate making these gear faces complete gears if desired to effect substantially a complete rotation of the lamp casing upon a vertical axis.

I have also shown means for limiting the rotary movement of the lamp casing about a horizontal axis to less than a complete revolution. In Figures 3 and 10 are best shown a groove 23 formed in the rear face of the casing bracket 18 and arranged to receive a guide pin 24 secured in the forward extremity of the bracket 15. The lamp casing is free to turn about the bracket 15 until the pin 24 engages the extremities of the guide slot 23. To afford a resilient abutment for the casing when the ends of the guide slot 23 are reached, I preferably mount the pin 24 in the chamfered opening 25 in the forward face of the forward face of the bracket 15 with its rearmost portion firmly secured. The larger forward portion of the chamfered slot 25 will permit slight bending of the guide pin 24 when contacted by the extremities of the guide slot 23, the pin returning to its original position by its inherent resiliency after the pressure upon it is removed.

From the above it will be noted that the vertical axis on which adjustments of the lamp casing 17 are effected, is permanently maintained as the central point about which the rotatable bracket 15 rotates. Rotation of the lamp casing about the horizontal axis does not in any way affect the position of the vertical axis. This is of great benefit in practical use.

While I am aware that some of the spotlight adjusting mechanisms now known have provision for the maintenance of either a permanent horizontal axis or a permanent vertical axis, I know of none wherein both the horizontal and vertical axes are permanently maintained as originally set by the fixing of the adjusting means upon the vehicle.

While it will be apparent that the illustrated embodiments of my invention herein disclosed are well calculated to adequately fulfill the objects and advantages primarily stated it is to be understood that the invention is susceptible to variation, modification and change within the spirit and scope of the subjoined claims.

What I claim is:

1. In a spotlight adjusting mechanism, a hollow bracket adapted to be fixed upon a vehicle, a handle slidably and rotatably mounted within the hollow bracket, a gear wheel having a forward bevel gear and a rear beveled clutch face keyed upon the handle, a multiple faced clutch member loosely mounted upon the handle and having forward and rear bevel clutch faces, and an intermediate external clutch face formed thereon, means carried by the handle for sliding said clutch member with the handle, a fixed bevel clutch face upon the hollow bracket for engagement with the rear bevel clutch face of the clutch member, means for normally pressing the handle rearwardly to maintain the clutch member in contact with said fixed clutch face, a casing, means under the control of the gear wheel for rotating the casing on a horizontal axis, and means under the control of the clutch member for rotating the casing on a vertical axis.

2. In a spotlight adjusting mechanism, a hollow bracket adapted to be fixed upon a vehicle, a handle slidably and rotatably mounted within the hollow bracket, a gear wheel having a forward bevel gear and a rear beveled clutch face keyed upon the handle, a multiple faced clutch member loosely mounted upon the handle and having forward and rear bevel clutch faces, and an intermediate external clutch face formed thereon, means carried by the handle for sliding said clutch member with the handle a fixed bevel clutch face upon the hollow bracket for engagement with the rear bevel clutch face of the clutch member, means for normally pressing the handle rearwardly to maintain the clutch member in contact with said fixed clutch face, a casing, a rotatable hollow bracket journaled in the fixed bracket and carrying a bevel gear at its lower extremity, connections between the casing and rotatable bracket, a gear wheel journaled in the fixed bracket and carrying a bevel gear meshing with the bevel gear of the rotatable bracket and an internal clutch face engaging with the external intermediate clutch face of the said clutch member, whereby when the handle is slid to bring the rear bevel clutch face of the first mentioned gear wheel and the forward bevel clutch face of the clutch member into engagement the rotation of the handle will rotate all of said gear wheels to revolve the rotatable bracket and casing.

3. In spotlight adjusting mechanism, a hollow bracket adapted to be fixed upon a vehicle and formed of two inter-connecting portions, a handle slidably and rotatably mounted in said bracket, a bevel gear wheel keyed upon the handle and held from horizontal movement by said bracket, said bevel gear wheel also carrying a rear bevel clutch face, a rotatable hollow bracket journaled upon both sections of said fixed bracket, a substantially vertically arranged hollow gear wheel mounted in the rotatable bracket and having a lower bevel gear meshing with the bevel gear upon the handle and an upper bevel gear, a hollow stub shaft journaled within the hollow bracket and having a bevel gear meshing with the upper bevel gear of said vertical gear wheel, a lamp casing fixed upon the stub shaft whereby rotation of the handle will rotate the casing about a horizontal axis regardless of the sliding movements of the handle, and means for revolving the lamp casing on a vertical axis including a bevel gear carried by said rotatable bracket, a gear wheel journaled within the fixed bracket and having a bevel gear meshing with the bevel gear on the rotatable bracket and an internal clutch face, and a slidable clutch member mounted to rotate upon and slide with the handle and formed with a forward bevel clutch face adapted to be slid into engagement with the rear clutch face of the bevel gear wheel keyed upon the handle and an external clutch face engaging with said internal clutch face whereby when the forward bevel clutch face for said clutch member is in engagement with the bevel gear keyed on the handle, rotary movement is imparted from the handle through the clutch member and said beveled gear wheels to the rotatable bracket.

4. In spotlight adjusting mechanisms, in combination with a fixed bracket adapted for attachment to a vehicle body, a hollow bracket journaled in the fixed bracket, a lamp casing, means for rotating the lamp casing on a horizontal axis, means for rotating the lamp casing on a vertical axis, and means for limiting the rotation of the lamp casing on a horizontal axis to less than a complete revolution including a member secured upon the lamp casing and abutting the hollow rotatable bracket, said member having an arcuate slot in its abutting face, and a pin fixed upon the rotatable bracket and extending beyond its abutting face into said slot.

5. In spotlight adjusting mechanisms, the combination of a fixed bracket, a hollow bracket journaled in the fixed bracket, a lamp casing, means for rotating the lamp casing on a horizontal axis, means for rotating the lamp casing on a vertical axis, and means for limiting the rotation of the lamp casing on a horizontal axis to less than a complete revolution including a member secured upon the lamp casing and abutting the hollow rotatable bracket, said member having an arcuate slot in its abutting face, and a pin fixed upon the rotatable bracket and extending beyond its abutting face into said slot, said pin being mounted within the bracket to form a resilient abutment to cushion the engagement of the ends of said slot with the pin.

6. In a spotlight adjusting mechanism, in combination with a selectively supportable hollow bracket, a lamp casing journaled therein, said lamp casing being provided with a resilient abutment, and means for limiting the degree of possible rotative movement of the lamp casing, comprising a fixed element provided with an arcuate slot in which said abutment on the lamp casing is adapted to movably engage and by the engagement of which said abutment against the ends thereof the desired limitation in the degree of possible rotative movement of the lamp casing is effected.

In witness whereof I hereunto set my hand.

RUDOLPH MILLER.